US011877019B2

(12) United States Patent
Mittal

(10) Patent No.: US 11,877,019 B2
(45) Date of Patent: *Jan. 16, 2024

(54) ADAPTIVE VIDEO CONSUMPTION

(71) Applicant: V-NOVA INTERNATIONAL LIMITED, London (GB)

(72) Inventor: Gaurav Mittal, London (GB)

(73) Assignee: V-NOVA INTERNATIONAL LIMITED

(*) Notice: Subject to any disclaimer, the term of this patent is extended or adjusted under 35 U.S.C. 154(b) by 0 days.

This patent is subject to a terminal disclaimer.

(21) Appl. No.: 17/099,294

(22) Filed: Nov. 16, 2020

(65) Prior Publication Data

US 2021/0144420 A1    May 13, 2021

Related U.S. Application Data

(63) Continuation of application No. 16/324,433, filed as application No. PCT/GB2017/052348 on Aug. 9, 2017, now Pat. No. 10,841,625.

(30) Foreign Application Priority Data

Aug. 9, 2016  (GB) ...................... 1613689

(51) Int. Cl.
H04N 21/2343    (2011.01)
H04N 21/442     (2011.01)
(Continued)

(52) U.S. Cl.
CPC ................ H04N 21/23439 (2013.01); H04N 21/234327 (2013.01); H04N 21/234363 (2013.01);
(Continued)

(58) Field of Classification Search
CPC ....... H04N 21/23439; H04N 21/44209; H04N 21/234327; H04N 21/234363; H04N 21/44218; H04N 21/26258; H04N 21/8456
See application file for complete search history.

(56) References Cited

U.S. PATENT DOCUMENTS 5,821,986 A    10/1998  Yuan et al.
10,708,667 B1 *  7/2020  Waggoner ............... H04L 65/80
(Continued)

FOREIGN PATENT DOCUMENTS

EP    2761881    8/2014
EP    2805523    11/2014
(Continued)

OTHER PUBLICATIONS

International Search Report and Written Opinion for PCT/GB2017/052348 dated Oct. 24, 2017.
(Continued)

Primary Examiner — Yassin Alata
(74) Attorney, Agent, or Firm — WORKMAN NYDEGGER

(57) ABSTRACT

A video streaming client is configured to check whether a target version of a desired video content is available for streaming from a video streaming server, the target version being encoded to a target value of an encoding attribute. The video streaming client obtains a data communication speed to the video streaming server, and determines that the data communication speed is sufficient to stream and display the target version of the desired video content. The target value is less than a maximum value of the encoding attribute which is decodable by the video streaming client. The video streaming client is configured to select to stream the target version of the desired video content even though the data communication speed is sufficient to stream a version of the
(Continued)

desired video content without playback interruption when encoded using a value of the encoding attribute which is higher than the target value.

20 Claims, 12 Drawing Sheets

(51) Int. Cl.
*H04N 21/262* (2011.01)
*H04N 21/845* (2011.01)

(52) U.S. Cl.
CPC . *H04N 21/26258* (2013.01); *H04N 21/44209* (2013.01); *H04N 21/44218* (2013.01); *H04N 21/8456* (2013.01)

(56) References Cited

U.S. PATENT DOCUMENTS

| | | | |
|---|---|---|---|
| 10,841,625 | B2 | 11/2020 | Mittal |
| 2007/0153916 | A1 | 7/2007 | Demircin et al. |
| 2009/0310944 | A1 | 12/2009 | Kispert |
| 2011/0176495 | A1 | 7/2011 | Roy et al. |
| 2011/0176496 | A1 | 7/2011 | Roy et al. |
| 2011/0211114 | A1 | 9/2011 | Cooper |
| 2012/0177101 | A1 | 7/2012 | Van Der Schaar |
| 2012/0284736 | A1* | 11/2012 | Friedman ........... H04N 21/2665 725/116 |
| 2013/0042015 | A1 | 2/2013 | Begen |
| 2013/0058393 | A1 | 3/2013 | Soroushian |
| 2013/0097309 | A1 | 4/2013 | Ma et al. |
| 2013/0125155 | A1* | 5/2013 | Bhagavathy ....... H04N 21/2343 725/10 |
| 2014/0095731 | A1 | 4/2014 | Carey et al. |
| 2014/0250231 | A1 | 9/2014 | Gouache et al. |
| 2014/0341026 | A1 | 11/2014 | Gahm et al. |
| 2014/0359678 | A1 | 12/2014 | Shivadas et al. |
| 2015/0010286 | A1 | 1/2015 | Newman et al. |
| 2015/0095450 | A1 | 4/2015 | Vitthaladevuni et al. |
| 2015/0156243 | A1 | 6/2015 | Skog et al. |
| 2015/0304686 | A1 | 10/2015 | Thiagarajan |
| 2016/0073106 | A1 | 3/2016 | Su et al. |
| 2016/0198225 | A1* | 7/2016 | Reznik ............... H04N 21/2343 725/12 |

FOREIGN PATENT DOCUMENTS

| | | |
|---|---|---|
| EP | 2845369 | 3/2015 |
| EP | 2873212 | 5/2015 |
| EP | 3042503 | 7/2016 |
| JP | 2015-065517 | 4/2015 |
| JP | 2015-192248 | 11/2015 |
| WO | 2012-015460 | 2/2012 |
| WO | 2015-034997 | 3/2015 |

OTHER PUBLICATIONS

Kumar et al., "Design and Implementation of a Dynamic Adaptive Video Streaming System with a Buffer Aware Rate Selection Algorithm", International Conference on Image Analysis and Processing, pp. 227-238.

Search Report issued in GB Application No. 1613689.7 dated Feb. 7, 2017.

Tan et al., "Frame Rate Control for Video Streaming", 2011, IEEE 36th Conference on Local Computer Networks, Oct. 4-7, 2011.

U.S. Appl. No. 16/324,433, Jan. 24, 2020, Office Action.

U.S. Appl. No. 16/324,433, Jul. 10, 2020, Notice of Allowance.

* cited by examiner

ADAPTIVE VIDEO CONSUMPTION

CROSS REFERENCE TO RELATED APPLICATIONS

This application is a continuation of U.S. patent application Ser. No. 16/324,433, filed Feb. 8, 2019, which is a US Nationalization of PCT International Patent Application No. PCT/GB2017/052348, filed Aug. 9, 2017, which claims priority to United Kingdom Patent Application No. 1613689.7, filed Aug. 9, 2016, the disclosures of which are incorporated herein by reference in their entireties.

FIELD OF THE INVENTION

The invention broadly relates to the field of adaptive bitrate streaming, and in particular to a method of dynamically and adaptively selecting video content available at one of a plurality of encoded profiles. Particularly, but not exclusively, the invention applies to over-the-top (OTT) distribution of encoded video content. Particularly, the invention applies to media players that control the downloading of encoded video content.

BACKGROUND OF THE INVENTION

Broadly speaking, adaptive bit rate streaming is a technique of determining, at a client device, the ability of the client device to receive and process an encoded video stream, and adapting the quality of the encoded video stream, in real time, to adjust the quality of the encoded video stream to suit an available bandwidth. The state-of-the-art in practical implementations of adaptive bitrate streaming includes Microsoft® Smooth Streaming (MSS), HTTP Live Streaming (HLS) and HTTP Dynamic Streaming.

These types of delivery are a combination of server and client software that detect a client's bandwidth capacity and adjust the quality of the video stream between multiple bitrates and/or image resolutions (i.e. frame size in pixels). The adaptive bitrate video experience is superior to the delivery of a static video file from a streaming server at a single bitrate, because the encoded video stream can be switched midstream to suit the client's available network speed. When delivering static video files, there can sometimes exist excessive playback delay due to slow initial buffering speeds, or pauses in playback when the video stream cannot be downloaded quickly enough. Both of these problems are caused when the client's network bandwidth cannot deliver the video content at an optimal speed, and are especially pronounced in situations of variable network bandwidth. Furthermore, the delivery of the static video file may not utilise the full potential of the client device resulting in a sub-optimal video stream being used for presentation by the client device. Microsoft® Smooth Streaming, HTTP Live Streaming, and HTTP Dynamic Streaming each use different protocols to receive video content, and so a client device must support each protocol. A standard for HTTP streaming of multimedia content has been developed, called MPEG-DASH, to enable consistent playback and unification of servers and clients of different vendors.

In general, in MPEG-DASH ("DASH"), multimedia content is captured and stored on an HTTP server and is delivered using HTTP. The content exists on the server in two parts: a Media Presentation Description (MPD), which describes a configuration of the available content, its various alternatives, their URL addresses, and other characteristics; and segments, which contain the actual multimedia bit streams in the form of chunks, in single or multiple files.

To play the content, a DASH client first obtains the MPD. The MPD can be delivered using HTTP, email, thumb drive, broadcast, or other transports. By parsing the MPD, the DASH client learns about the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client selects the appropriate encoded alternative and starts streaming the content by fetching the segments using HTTP GET requests.

After appropriate buffering to allow for network throughput variations, the DASH client continues fetching the subsequent segments and also monitors the network bandwidth fluctuations. Depending on its measurements, the DASH client decides how to adapt to the available bandwidth by fetching segments of different alternatives (with lower or higher bitrates) to maintain an adequate buffer. The highest supported frame size, or image resolution, is chosen, depending on network bandwidth.

In addition, there are recent moves towards content-aware encoding, where different bitrate and resolution options are encoded and made available on a per-title basis (i.e. each individual film or television programme is encoded at bitrates and resolutions that suit the particular video content). This has advantages in that some video content can be delivered in very good quality (PSNR around 45 dB) at relatively low bitrates, and so bandwidth efficiencies are achieved, whereas other more complex video content cannot be delivered at certain resolutions (e.g. 1080p) in reasonable quality (at or above 38 dB PSNR) without being encoded at a relatively high bitrate, and so the bandwidth required to view at that resolution must be relatively high, for optimal viewing experience.

Knowing that and how a particular video content should be encoded in multiple resolution/bitrate pairings is a technique which has been put forward by at least Netflix' for optimising efficiency and viewing experience of video received via an over-the-top (OTT) architecture.

However, despite adaptive bitrate streaming being a huge improvement over static video file streaming, and finding widespread practical use, there is room to improve adaptive bitrate streaming further. Current methods of adaptive bitrate video streaming attempt to provide a video client, over a data network, with a highest possible image resolution that (a) the decode capability of the video client will support, and (b) a bandwidth of a channel connecting the video client to the network will support.

For example, an adaptive bitrate video streaming server may provide a video client with the choice of a '720p version of video content encoded at 5 Mbit/s and a 1080p version of the same video content encoded at 8 bit/s. If the video consumer supports decoding at 1080p and the available bandwidth supports 8 Mbit/s data transfer speeds, then the known adaptive bitrate streaming technique will cause the video client to choose to download the 1080p version of the video content encoded at 8 Mbit/s data rate, at least while the available bandwidth supports 8 Mbit/s download speeds.

However, this approach of defaulting to the highest decodable resolution for available bandwidth does not always provide the best viewing experience, nor does this approach make best use of system resources.

Therefore, one problem is how to improve the viewing experience for a user watching video content. Another problem is how to make better use of system resources.

SUMMARY OF THE INVENTION

There is provided a video streaming client and method as set out in the appended claims.

A target video format (e.g. resolution, frame rate) is calculated for a video consumer device which is lower than a maximum video format which is decodable by the video consumer device. The target video format is used to make a decision on what format (e.g. resolution, frame rate) of video content to download for a given available bandwidth connection. The video content is then streamed in the target video format rather than the maximum video format, even if the available bandwidth will allow streaming of the maximum video format.

Optionally, the video content is streamed at the target video format using a version of the video content encoded at the highest bitrate supported by the available bandwidth.

For example, video content is made available at '720p resolution at two bitrates, namely 5 Mbit/s and 7.5 Mbit/s, and also at 1080p resolution at two bitrates, namely 8 Mbit/s and 12 Mbit/s (YouTube® recommended encoding bitrates). The invention provides that a target resolution of the video client is determined to be '720p and not 1080p even though the video client is able to decode video signals encoded at 1080p frame size and scanning type. In this example, when an available bandwidth of 12 Mbit/s is available at the video consumer, the video consumer chooses to download the video content at '720p resolution at a bitrate of 7.5 Mbit/s, rather than at 1080p resolution with a bitrate of 12 Mbit/s. Likewise when the available bandwidth is 8 Mbit/s, the video consumer chooses to download the video content at 720p resolution at a bitrate of 7.5 Mbit/s, rather than at 1080p resolution with a bitrate of 8 Mbit/s.

In this way, one or more of the following advantages is provided:
1. The viewing experience is improved by the improved quality of video, because, generally, the bits per pixel is higher at the target video format when compared with the bits per pixel at the decoding resolution of the video consumer (e.g. there may be more frames per second available at the target resolution, or higher video quality due to reduced loss during compression);
2. The battery life and processing resources of the video client is improved by not decoding at the highest video format, and separately and potentially transcoding to a lower video format for display for example when the display resolution of the video consumer is less than a decoding capability of the video consumer; and
3. The communication channel between the video consumer and the adaptive bitrate server is used more efficiently.

According to a first aspect, there is provided a video streaming client configured to identify a target version of a desired video content for streaming from a video streaming server, the target version being encoded to a target value of an encoding attribute. The video streaming client is configured to obtain a data communication speed to the video streaming server, and determine that the data communication speed is sufficient to stream and display the target version of the desired video content. Wherein, the target value is less than a maximum value of the encoding attribute which is decodable by the video streaming client.

If the target version is available at the video streaming server, the video streaming client is configured to select to stream the target version of the desired video content even though the data communication speed is sufficient to stream a version of the desired video content without playback interruption when encoded using a value of the encoding attribute which is higher than the target value.

According to a second aspect, there is provided a method of selecting video content to stream across a network, the video content being available in a plurality of differently encoded versions. The method comprises identifying a target version of a desired video content for streaming from a video streaming server, the target version being encoded to a target value of an encoding attribute. The method also comprises obtaining a data communication speed between a video streaming client and the video streaming server, and determining that the data communication speed is sufficient to stream and display the target version of the desired video content at the video streaming client. The target value is less than a maximum value of the encoding attribute which is decodable by the video streaming client. The method comprises, if the target version is available from the video streaming server, selecting to stream the target version of the desired video content even though the data communication speed is sufficient to stream a version of the desired video content without playback interruption when encoded using a value of the encoding attribute which is higher than the target value.

According to a third aspect, there is provided a computer program comprising instructions which, when executed, cause a data processing device to perform the above method.

Optionally, the encoding attribute relates to a display property of video content. Optionally, the encoding attribute relates to a display capability of a video display.

Optionally, the encoding attribute is one of the following: frame size in pixels; pixels per frame; frame rate; scanning type; colour depth; encoder profile; and encoder profile level.

Optionally, the encoding attribute is frame size in pixels.

Optionally, the video streaming client is configured to compute the target value based at least in part on a display capability of a display at the video streaming client. Optionally, the video streaming client is configured to compute the target value based at least in part on a display resolution of a display at the video streaming client.

Optionally, the display resolution is one of the following: 320×240; 512×288; 640×480; 768×432; 960×540; 1024×576; 1280×720; 1920×1080; 2560×1440; 3840×2160; and 7680×4320 pixels.

Optionally, the video streaming client is configured to obtain a target value is based at least in part on a viewing distance of a viewer to the display at the video streaming client. Optionally, the target value is obtained based at least in part on the viewing distance and a pixel density of the display. Optionally, the video streaming client is configured to increase the target value if the viewer moves closer than a first distance threshold to the display. Optionally, the video streaming client is configured to decrease the target value if the viewer moves further than a second distance threshold from the display. Optionally, the video streaming client has access to a sensor configured to measure the distance of the viewer to the display.

Optionally, the target version is available in a plurality of bitrate versions, the video streaming client being configured to select to stream the target version at the highest available bitrate version which is supported by the data communication speed.

Optionally, the video streaming server stores a plurality of versions, at least two of the plurality of versions being encoded to a different value of the encoding attribute, and the video streaming client is configured to select one of the plurality of versions.

Optionally, the video streaming server performs transcoding of the video content on-the-fly, and the video streaming client is configured to request an on-the-fly transcoded version encoded to the target value of the encoding attribute.

Optionally, the video streaming client is configured to request a particular on-the-fly transcoded version based at least in part on the data communication speed.

Optionally, the video streaming client is configured to stream the video content in multi-second or part-second segments of encoded video data.

Optionally, the target version is encoded to comprise a base layer and an enhancement layer, wherein the base layer is decodable to present the video content at a base level of video reproduction quality, and the enhancement layer is decodable with the base layer to present the video content at an enhanced level of video reproduction quality which is higher than the base level of reproduction quality. Optionally, when the target value is a first value, the video streaming client is configured to select to stream a target version comprising the base layer only, and when the target value is a second higher value, the video streaming client is configured to select to stream a target version comprising the base layer and the enhancement layer.

Optionally, if the target version is not available, the video streaming client is configured to obtain a data communication speed to the video streaming server, and to determine that the data communication speed is sufficient to stream and display a decoder version of the desired video content, wherein the decoder version is encoded using the maximum value of the encoding attribute which is decodable by the video streaming client.

Optionally, the video streaming client operates on a computing device having an integrated display.

Optionally, the video streaming client is part of a mobile device, such as a smartphone, tablet computer or laptop computer.

Optionally, the video streaming server is an edge server of a content delivery network.

Optionally, streaming control is performed at the video streaming client.

Additionally, the present invention could provide the following further advantages, advantageously when implemented with multiple layers. First, it would allow to decrease the costs of encrypting and decrypting the overall content as only the base layer needs to be encrypted to protect the content (as further described in patent publication numbers WO 2013/011496 and U.S. Ser. No. 13/188,237 which are incorporated herein by reference). Second, it would allow reduction of the storage needed to store all the various video profiles as only incremental enhancements need to be stored. This would be particularly beneficial to a number of applications such as Cloud/Network Digital/Personal Video Recording (DVR/PVR). Thirdly, it would allow reduction of the power consumption for Content Delivery Network (CDN) and encoders as less encoding and less storage is required. Fourth, since the algorithm is agnostic of the underlying transport mechanism, the invention could be applied to any existing Adaptive Bit Rate techniques (e.g., Apple® HLS, MPEG DASH, etc.) and therefore can be flexibly deployed over existing and future services.

BRIEF DESCRIPTION OF THE DRAWINGS

Embodiments of the invention will now be described with reference to the accompanying drawings, in which.

DETAILED DESCRIPTION OF THE EMBODIMENT(S)

Embodiments of the present inventions will be now described with reference to the attached Figures. It is to be noted that the following description is merely used for enabling the skilled person to understand the present invention, without any intention to limit the applicability of the present invention to other embodiments which could be readily understood and/or envisaged by the reader.

Figure 1:
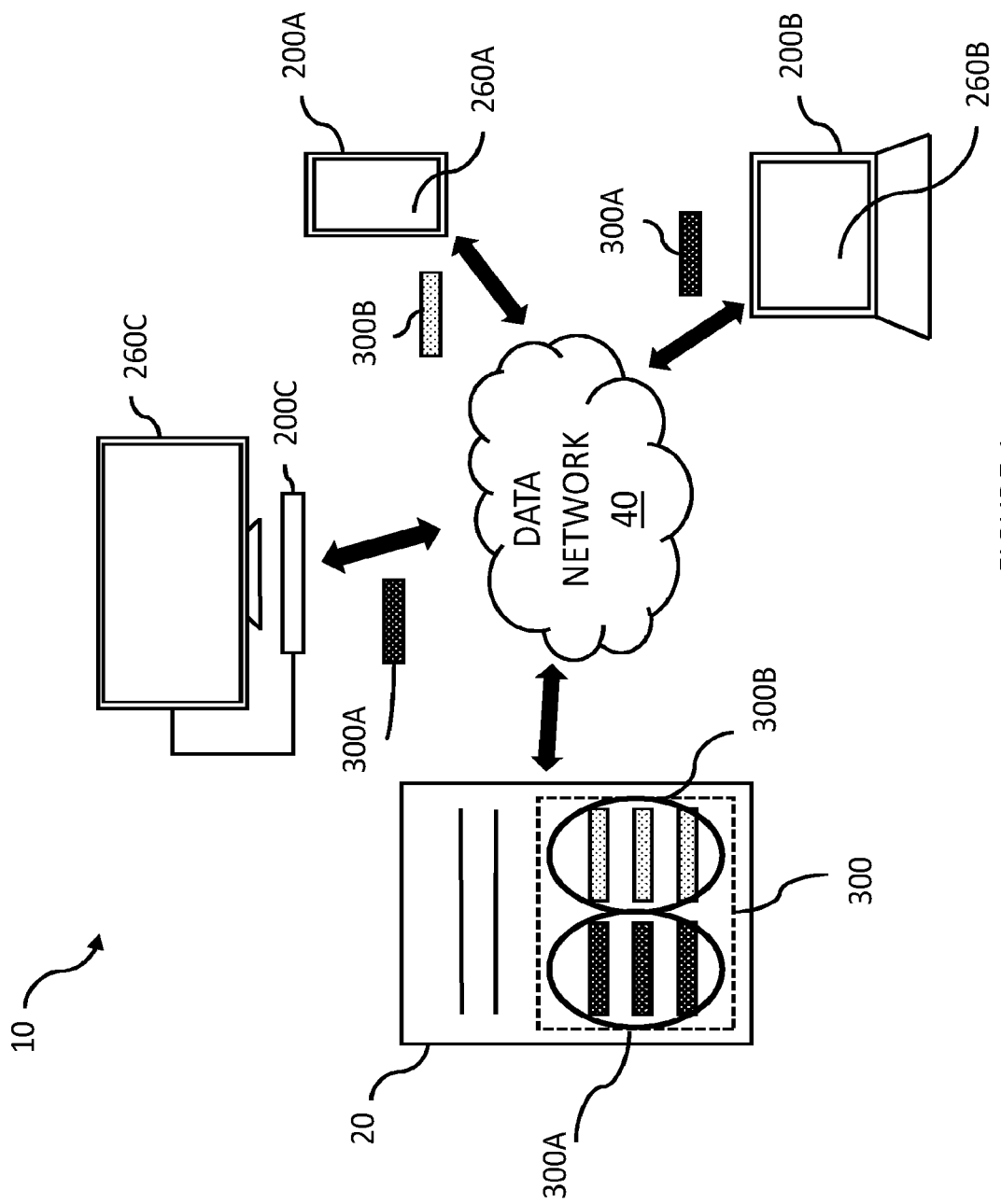
FIG. 1 is a block diagram showing a system for streaming video across a network.

FIG. 1 is a block diagram showing a system 10 for performing an example adaptive bitrate streaming selection method. The system 10 comprises a video streaming server 20 which is arranged to deliver encoded video content 300 to one or more client devices 200, labelled 200A, 200B, 200C. The encoded video content is arranged to be delivered over a data network 40.

In more detail, the encoded video content 300 is available in at least one encoded version, and FIG. 1 shows two encoded versions 300A and 300B. The encoded video content 300 is deliverable to the one or more client devices 200A, 200B, 200C via corresponding encoded data streams containing an appropriately chosen encoded version 300A, 300B. Each client device 200A, 200B, 200C respectively includes a video streaming client (not shown) which is able to select an encoded version appropriate to that device. Each client device 200A, 200B, 200C also has data decoding capability which is able to decode the selected encoded version 300A or 300B of the encoded video content 300.

The streaming server 20 can be any suitable data storage and delivery server which is able to deliver encoded data to the client devices 200 over network 40. Streaming servers are well known in the art, and may use unicast and multicast protocols. The streaming server is arranged to store, or additionally or alternatively generate on-the-fly, the encoded video content 300 in a number of encoded versions 300A, 300B as necessary to satisfy the needs of the various client devices 200A, 200B, 200C. The encoded video content 300 is generated by an encoder (not shown in FIG. 1), which may be located on the streaming server 20, or elsewhere. The encoder may operate to generate the encoded data 300 for on-demand streaming, or may operate to provide a live streaming service, where the encoded data 300 is generated in substantially real-time for real-time streaming of unencoded data which is being produced in real-time.

The client devices 200 are one of a number of suitable video streaming devices. Known video streaming devices 200 include set-top boxes, digital televisions, smartphones, tablet computers, laptop computers, desktop computers, video conferencing suite technology, and so on as is known to the skilled person. In this example, client device 200A is a mobile phone with integrated display 260A, client device 200B is a laptop computer with integrated display 260B, and client device 200C is a set-top box or other streaming device without an integrated display, and the set-top box 200C outputs decoded video for presentation on external display 260C.

The network 40 can be any type of data network suitable for connecting two or more computing devices together, such as a local area network or a wide area network, and can include terrestrial wireless and wired connections, and satellite connections. The data network 40 may also be or include telecommunications networks, and in particular telecommunications networks that provide cellular data coverage. It is expected that the data network 40 would include the Internet, and connections thereto.

Figure 2:
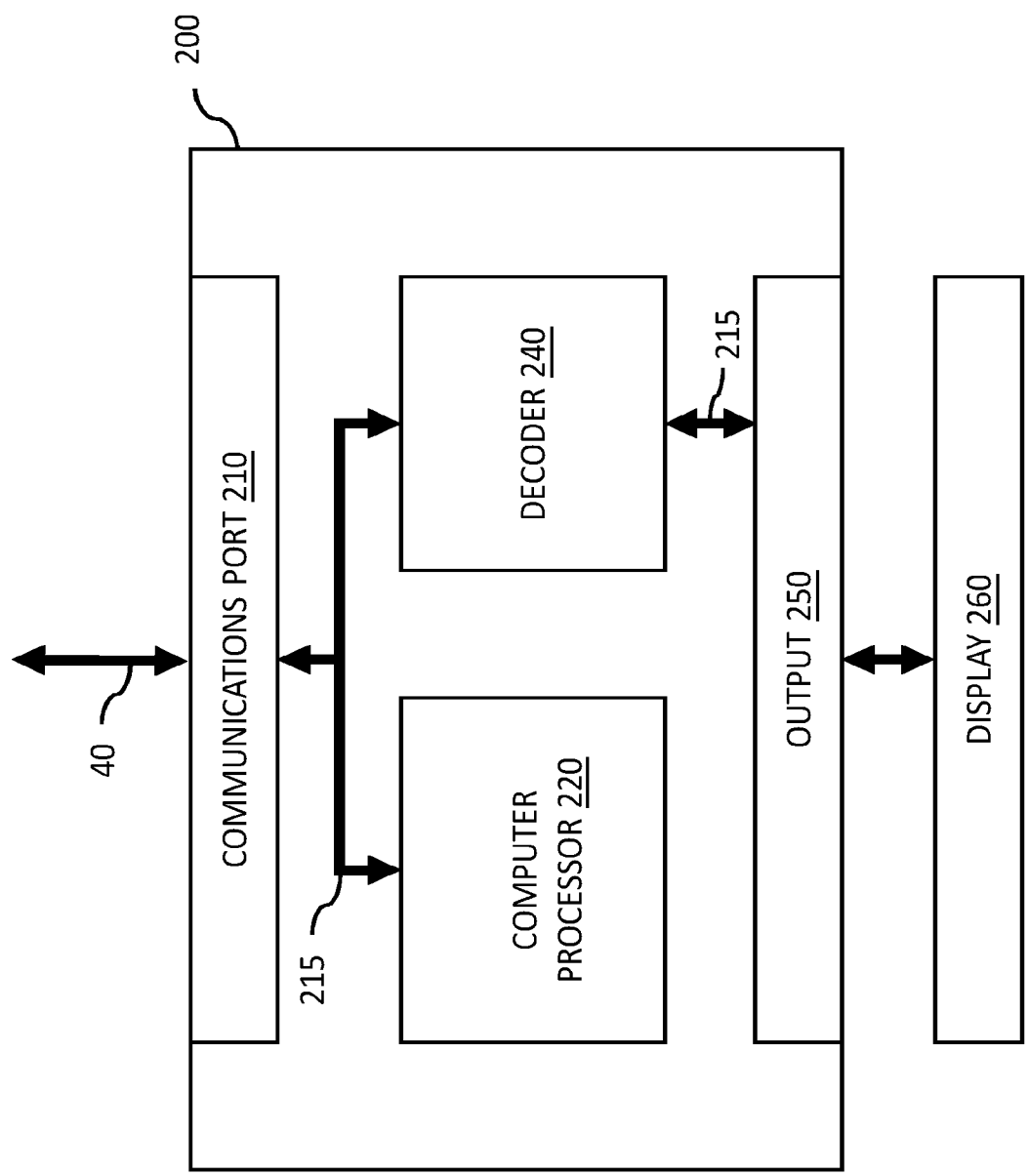
FIG. 2 is a block diagram showing an example client device having an adaptive bitrate streaming capability.

FIG. 2 is a block diagram showing an example client device 200 having dynamically adaptive bitrate streaming capability. The client device 200 comprises a communications port 210, a communications bus 215, a computer processor 220, a decoder 240 and an output 250. At the client device 200, there is a display 260 for presenting decoded video content to a viewer. The display 260 is either an integrated part of the client device 200 (such as in the example of a mobile device 200A or laptop 200B in FIG. 1) or is separate from the client device (such as in the example of a set-top box 200C in FIG. 1). The display 260 when external may be a computer monitor or a television.

The computer processor 220 is configured to initiate and control reception of an encoded data stream via the communications port 210, which is in turn configured to communicate with the streaming server 20 across the data network 40. Once buffered at least partly, the encoded data stream is passed to the decoder 240 for decoding. The decoder 40 is configured to decode the buffered part of the encoded data stream and to pass the decoded data to the output for presentation to a user of the client device 200 via display 260.

Clearly, the above description is a simplified version of how encoded data streams are buffered, decoded and, if appropriate, output, and is provided not as a comprehensive discussion as to how the decoding and display of encoded data in client devices works, but so as to give sufficient context in which to explain the invention.

Figure 3:
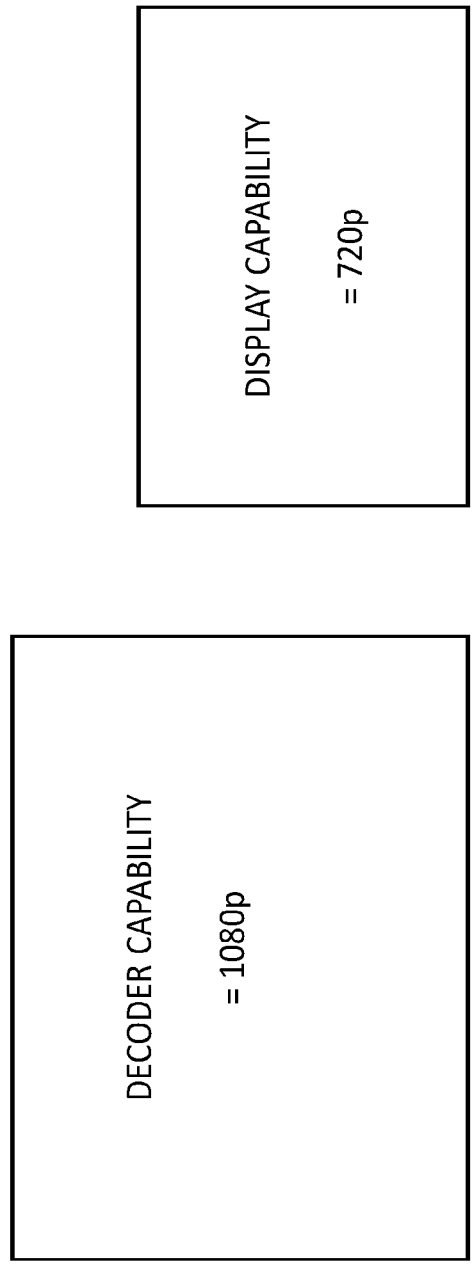
FIG. 3 is a block diagram illustrating that some client devices have a decoder with a decoder capability which is greater than a display capability of the display.

FIG. 3 is a block diagram illustrating that some client devices 200 have a decoder 240 with a decoder capability which is greater than a display capability of the display 260. For example, a client device 200 may have a decoder 240 which is capable of decoding encoded video data which is encoded with a frame size of 1080×1920 pixels (commonly referred to as 1080p HD resolution). However, the client device 200 may output to a display 260 which is not able to display at 1080p HD resolution because the display resolution of the display 260 is 720×1280 pixels (commonly referred to as '720p HD resolution). In the prior art, the client device 200 is configured to decode the encoded video data at 1080p and then to downsample the decoded video data to the native resolution of the display 260. This principle applies also to other resolutions, and also to examples where the decoder capability is greater than the display capability in respect of another encoding attribute, such as colour depth or frame rate. In all cases where a decoder 240 is decoding encoded video data which is encoded to an encoding parameter which is greater than that displayable by an associated display 260, computing resources and power are used inefficiently, and the final video output on display 260 may be less than optimal.

Figure 4:
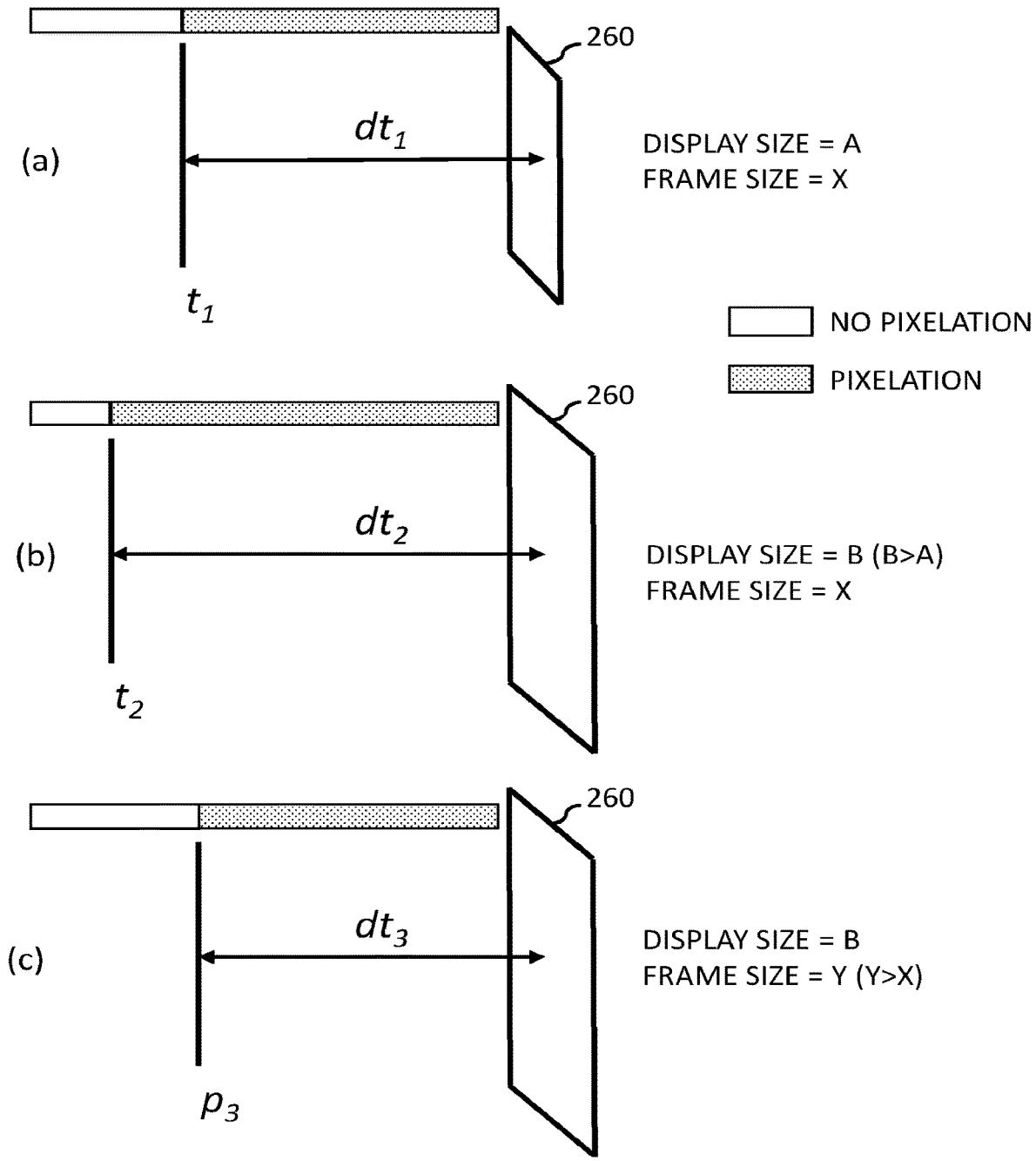
FIG. 4 is an illustration of the impact a viewing distance has on the perception of output video quality for a given viewer, display size, display resolution and frame size.

FIG. 4 is an illustration of the impact a viewing distance has on the perception of output video quality for a given viewer, display size, display resolution and frame size. Generally speaking, as a viewer moves further from a given display 260, the frame size of the decoded video data can be smaller as pixelation will not be perceived by the viewer past a distance threshold t. Conversely, as a viewer moves closer past distance threshold t to the given display 260, the frame size of the decoded video data must be larger in order to avoid pixelation from being perceived by a viewer.

For example, in FIG. 4(a), there is a distance threshold ti to the display beyond which no pixelation will be perceived for a given viewer with 20/20 vision at a frame size equal to X pixels, assuming that the display size is A units of distance. In other words, for a given pixel density X/A, the user should be a minimum of distance ti from the display 260.

In FIG. 4(b), the size of the display 260 is increased from A to B units of distance while the frame size remains at X pixels to illustrate that when the pixel density decreases from X/A to X/B, where B>A, then the distance threshold ti moves further from the display 260 to t2.

FIG. 4(c) illustrates that increasing the frame size from X to Y, while the display remains at size B, reduces the distance threshold from 12 to t3.

In many cases, it is only necessary to stream and decode video content having a frame size equal to the display resolution when a viewer is closer than a certain distance from the display 260.

Figure 5:
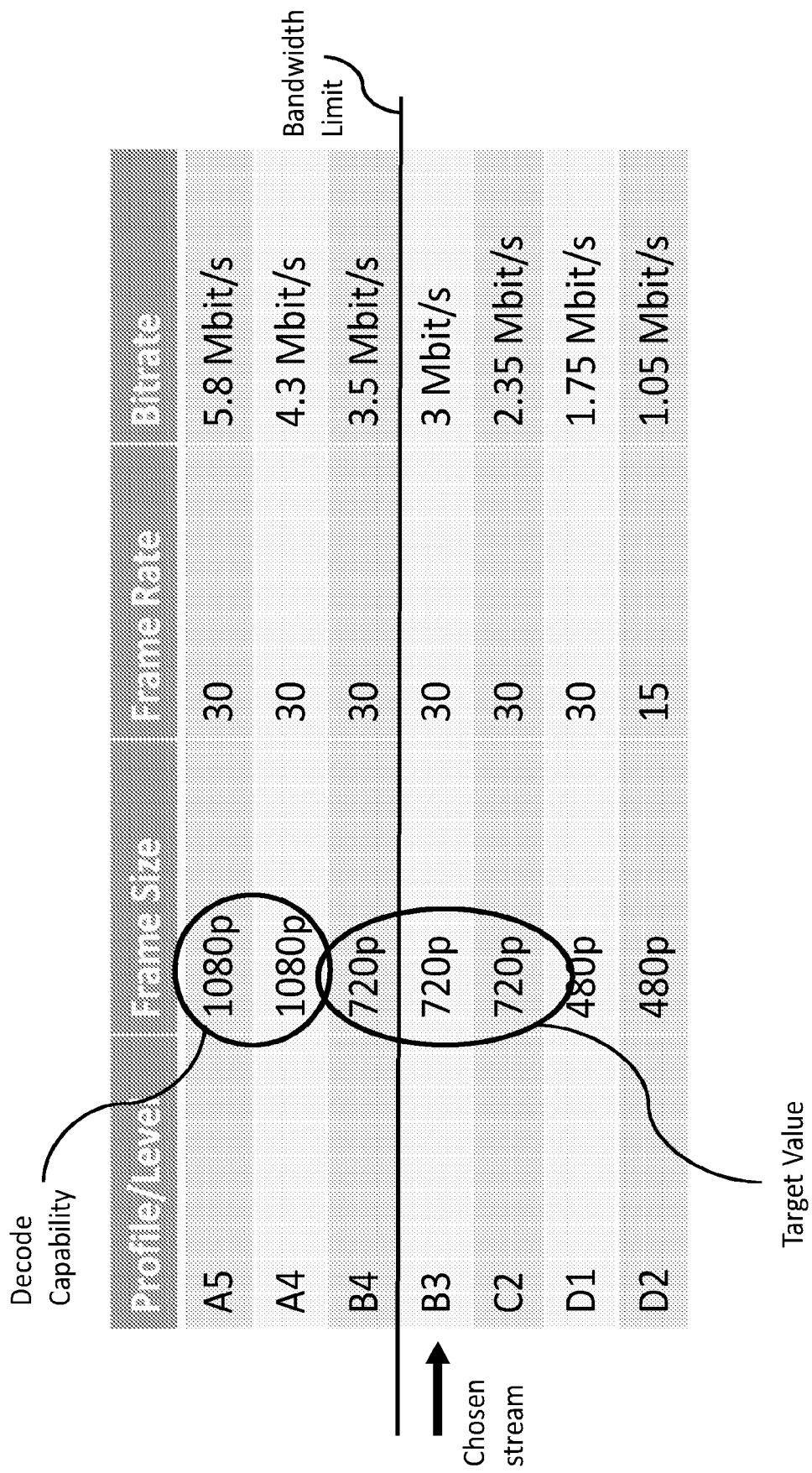
FIG. 5 is a table illustrating a number of different versions of encoded video data representing the same video content.

FIG. 5 is a table illustrating a number of different versions of encoded video data representing the same video content. Each version is identified by a profile (profile type and level), for example profiles A, B, C, and D refer to encoding constraints used when encoding the video data, and include H.264 profile types (such as Baseline Profile, Extended Profile, High Profile, etc.) at a particular level as would be known to the skilled reader in this field. The level refers to a further set of constraints which a decoder must be able to meet in order to decode the encoded video data at the particular profile, such as an ability to decode a certain minimum frame size, at a given frame rate with a given maximum bitrate. For each profile, the video is encoded at a particular frame size, frame rate and bitrate (within the aforesaid constraints) to suit various client devices 200 that may be expected to request the video content. Additionally, a number is given to identify each version of the video data for the purposes of this description.

In prior video streaming systems, a video streaming client would select, automatically, the encoded video content at a maximum profile and level which can be decoded by the decoder 240 at the client device 200. If the bandwidth on the data network 40 supports download speeds that would result in uninterrupted playback at the client device 200, then the encoded video content would be downloaded at the maximum profile. If the download speed is insufficient, then a lower profile would be selected.

This disclosure introduces the concept of a target version of encoded video data, the target version being encoded to a target value of an encoding attribute, wherein the target value is less than a maximum value of the encoding attribute which is decodable by the video streaming client. Additionally, the concept comprises selecting to stream the target version of the desired video content even though the data communication speed is sufficient to stream a version of the desired video content without playback interruption when encoded using a value of the encoding attribute which is higher than the target value.

In this way, efficiency savings are made in the network, because the streaming system is not always streaming the highest available profile for the video content, but is instead making a more sophisticated decision about which version is best to stream. This concept has the potential to reduce bandwidth usage or increase output quality, or both, as will become apparent. Also, this concept has the ability to use computing resources at the client device more efficiently and to reduce power consumption.

Referring again to FIG. 5, there are seven different versions of encoded video data at different profiles and levels. For example, there is a profile, A5, which is encoded to have a frame size of 1080p (or 1920×1080 pixels, scanned progressively), encoded at a frame rate of 30 frames per second, and which has a resulting bitrate of 5.8 Mbit/s. Another profile, A4, is encoded with the same frame size and frame rate, but with a lower bitrate of 4.3 Mbit/s, perhaps as a result of encoding parameters (for example the use of more motion prediction and fewer I-frames) or perhaps as a result of a higher quantisation error. Most probably, the profile A4 will have a lower SNR quality measure than profile A5, but as a trade-off can be streamed successfully (i.e. without playback interruption) using a lower bandwidth connection. Profiles B4, B3 and C2 are encoded to have a frame size of 720p (or 1280×720 pixels, scanned progressively), each at 30 frames per second, but again having different bitrates (3.5 Mbit/s, 3 Mbit/s and 2.35 Mbit/s, respectively). Profiles D1 and D2 are encoded to have a frame size of 480p (or 640×480 pixels, scanned progressively), with D1 at 30 frames per second, and D2 at 15 frames per second. Again, each profile as a different bitrate (1.75 Mbit/s and 1.05 Mbit/s, respectively).

In the example of FIG. 3 where the display resolution of display 260 is less than the maximum image resolution decodable by the decoder 240, the target value of the encoding attribute (frame size), is chosen to be equivalent to the display resolution of display 260 which is equal to 720p. In other words, the target value is less than the maximum decoding ability of the decoder 240 (equal to 1080p). So, the video streaming client will restrict, at least initially, a selection of available profiles to those having a frame size encoded using an encoding attribute (frame size) equivalent to 720p.

Looking again to FIG. 5, the target values are shown circled. Additionally, the bandwidth limit between the video streaming server 20 and the video client 200 is shown, and is less than 3.5 Mbit/s but more than 3 Mbit/s, and so will allow streaming of profile B3 at 720p, 30 fps and at a bitrate of 3 Mbit/s. This profile is selected for streaming.

Figure 6:
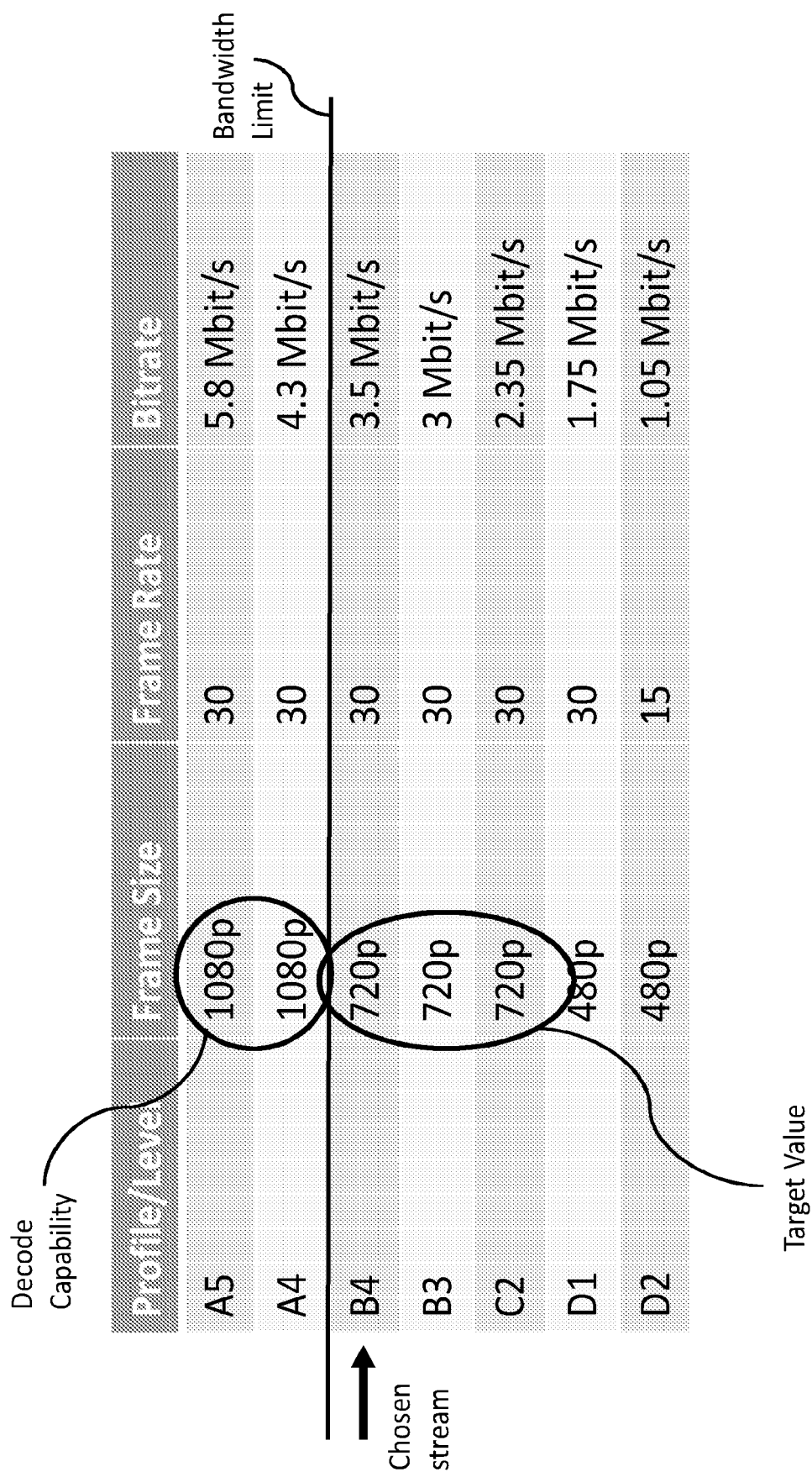
FIG. 6 is a table illustrating the effect of an increasing bandwidth and download speed between the video streaming server and the video client.

FIG. 6 is a table illustrating the effect of an increasing bandwidth and download speed between the video streaming server 20 and the video client 200. Now, the bandwidth limit is less than 4.3 Mbit/s but is more than 3.5 Mbit/s, and so profile B4 can be chosen. The video content is optionally available in segments, which allows switching to differently encoded segments midstream. Profile B4 is encoded at 3.5 Mbit/s and so the output quality of the video to a viewer is improved.

Figure 7:
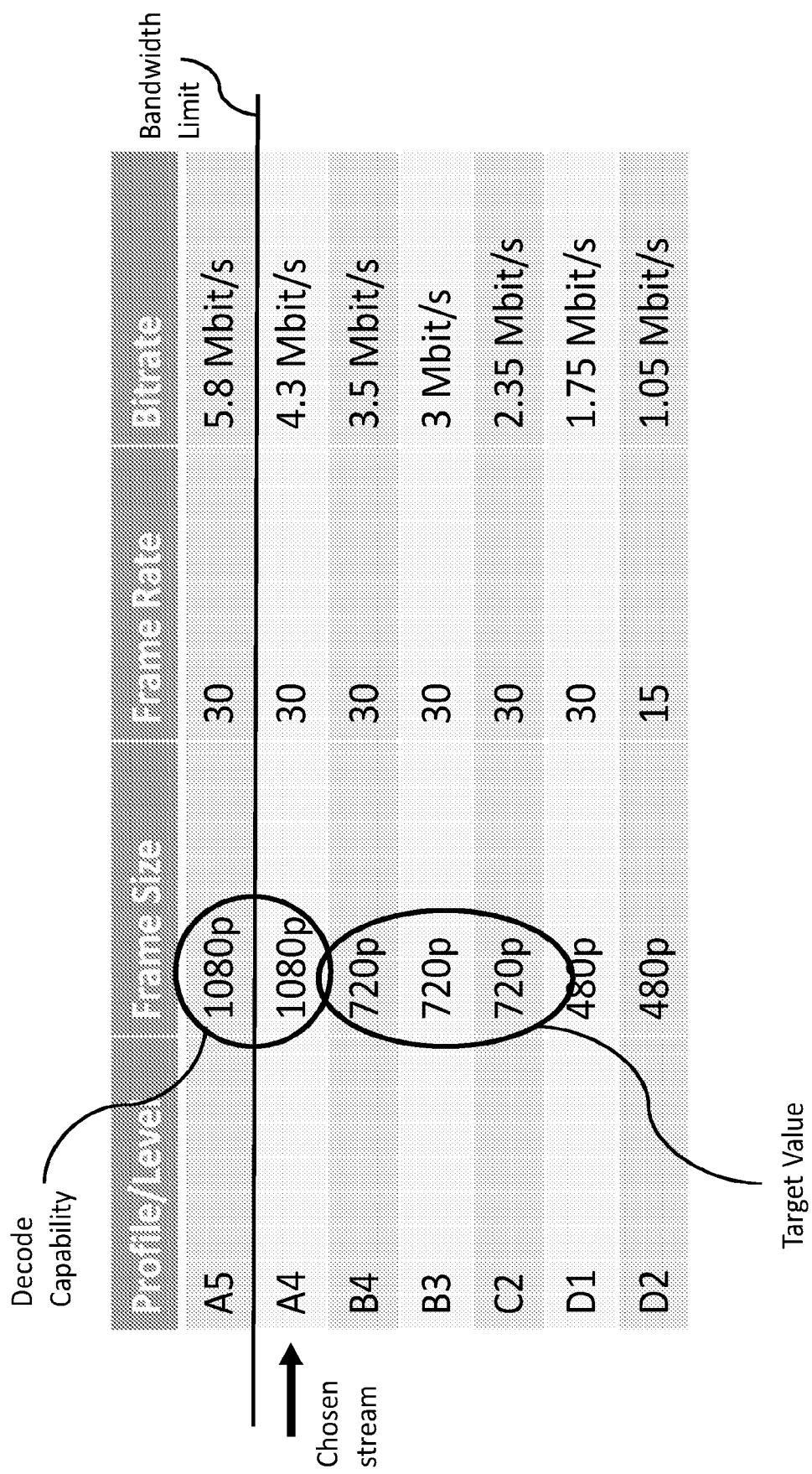
FIG. 7 is a table illustrating the effect of a further increase in the bandwidth and download speed between the video streaming server and the video client.

FIG. 7 is a table illustrating the effect of a further increase in the bandwidth and download speed between the video streaming server 20 and the video client 200. Now, the bandwidth limit is less than 5.8 Mbit/s but is more than 4.3 Mbit/s, and so profile A4 can be chosen. However, profile A4 is encoded using a value of the encoding attribute (frame size) of 1080p, which is greater than the target value of 720p. So, the video streaming client on video client 200 instead chooses to remain with profile B4, which delivers 720p resolution video at 3.5 Mbit/s. If the video streaming client had chosen to switch to profile A4, then a downsampling operation would have had to have been performed on the client device 200. This downsampling operation requires computing resources and energy. Also, by downsampling, information that was downloaded and decoded is wasted, which in turn wastes the computing resources, bandwidth and energy required to download that unused information.

Also, the number of bits of information per displayed pixel is increased. For example, for profile B4 at '720p, there are 1280×720 pixels per frame, or 921600 pixels per frame. At 3.5 Mbit/s, there is roughly 3.8 compressed bits per pixel per second. For profile A4 at 1080p, there are 1920×1080 pixels per frame, or 2073600 pixels per frame. At 4.3 Mbit/s, there is roughly 2.07 compressed bits per pixel per second. Considering that the majority of those decoded pixels will be downsampled (from 2073600 pixels to 921600 pixels) for presentation on display 260, then the information available per pixel may be crudely reduced by half, to just over 1 compressed bit per pixel per second of useful information. This compares unfavourably with 3.8 compressed bits per pixel per second for target profile B4.

Figure 8:
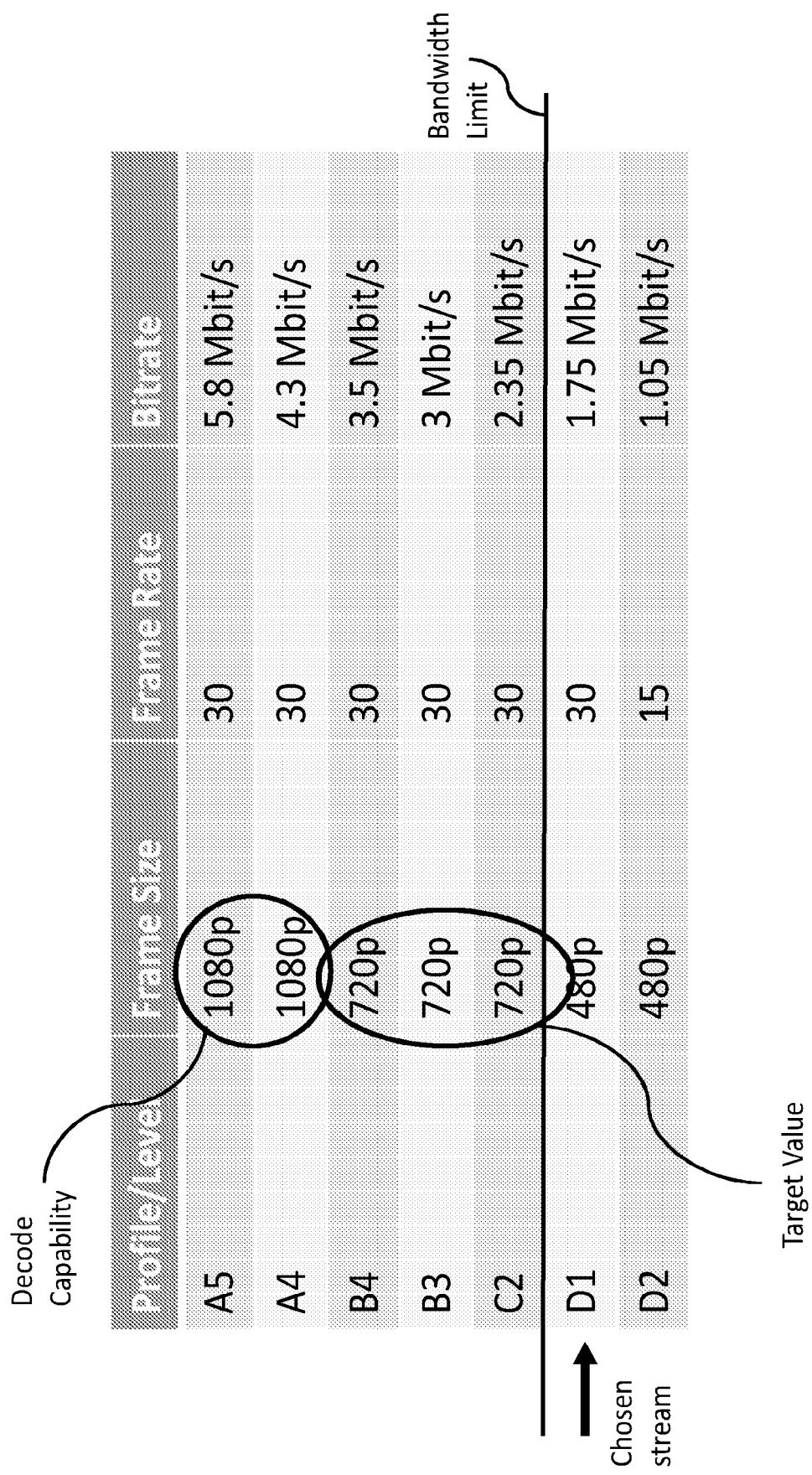
FIG. 8 is a table illustrating the effect of a decrease in the bandwidth and download speed between the video streaming server and the video client.

FIG. 8 is a table illustrating the effect of a decrease in the bandwidth and download speed between the video streaming server 20 and the video client 200. Now, the bandwidth limit is less than 2.35 Mbit/s but is more than 1.75 Mbit/s, and so profile D1 can be chosen, which is not a target version because the encoding attribute (frame size) is less than the target value of '720p. However, profile D1 is an available profile which can be decoded and displayed at client device 200, and so is selected.

Figure 9:
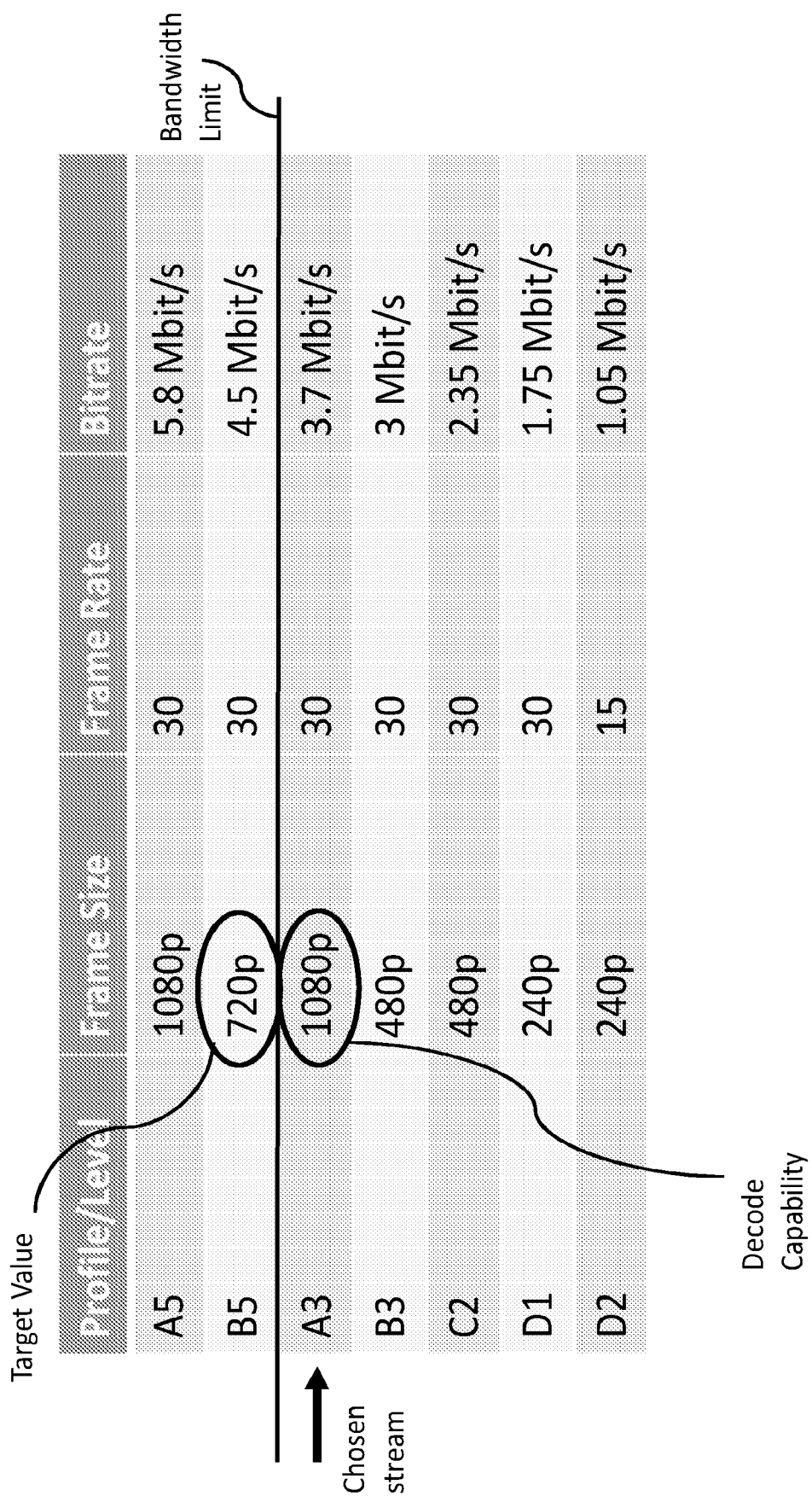
FIG. 9 is a table illustrating an example whereby there is a single available target version.

FIG. 9 is a table illustrating an example whereby there is a single target version B5, having target value '720p of encoding attribute (frame size) and which is encoded at a bitrate of 4.5 Mbit/s which exceeds the available bandwidth. In this example, there isn't a target version available having a bitrate which is downloadable without playback interruption. In this scenario, the video streaming client will revert to the policy of selecting the profile which can be downloaded and successfully played without interruption based firstly on the decoding capability at the client device 200, which in this example is 1080p. Profile A3 having a frame size of 1080p at 30 frames per second and a bitrate of 3.7 Mbit/s is selected for streaming. Otherwise, if the bandwidth is insufficient for profile A3, then one of the remaining lower bitrate profiles would be downloaded, bandwidth permitting.

Figure 10:
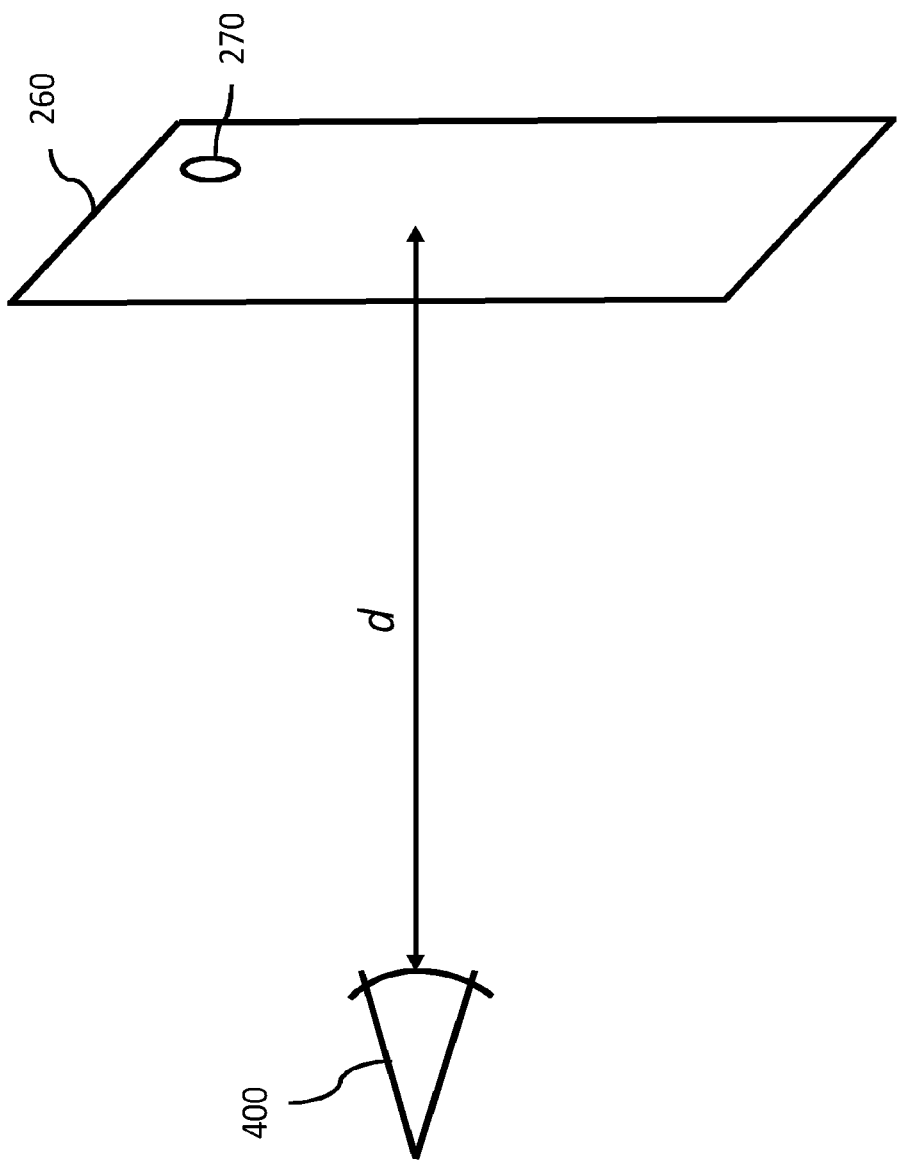
FIG. 10 is a schematic drawing illustrating a viewing distance d of a viewer from the display.

FIG. 10 is a schematic drawing illustrating a viewing distance d of a viewer 400 from the display 260, and in particular from the front active part of the display 260, such as the display screen forming the video image. As mentioned earlier in relation to FIG. 4, the distance from a viewer to the display has an impact on the perceived quality of the displayed video, depending also on other factors such as pixel density and the type of vision of a viewer (20/20 vision, 20/10 vision, etc.). This information can be used to determine a useful and efficient target value of the encoding attribute, and so the computer processor 220 in this further example is configured to obtain the target value based at least in part on the viewing distance of a viewer to the display 260.

Broadly speaking, if a user is beyond a first threshold distance from the display, then the image resolution (or frame size) may not need to be so great to achieve the same perceived level of quality. In other words, the target value of 720p used in the example above may be reduced to 480p when a user is further than the first threshold distance, and may be increased back to 720p when the user is at or is closer than the threshold distance. Similarly, colour perception may not be as accurate at viewing distances d greater than a second threshold distance from the display, and so the encoding attribute of colour depth may be used to determine the target version, and the target value may decrease as viewing distance d increases. In the same way, the frame rate required may change as the viewing distance d changes.

Of course, more specifically, the target value of the encoding attribute is usefully based also on a pixel density of the display. Here, referring back also to FIG. 4, for a lower pixel density of a given display (number of pixels/physical display size), the target value may need to be higher because pixelation occurs at a viewing distance d which is closer than for a physically smaller display 260A.

A sensor 270 is included in or next to display 260 and the sensor 270 is configured to measure the viewing distance d of the viewer to the display. Specifically, the viewing distance d is to a viewer's face, and more particularly to a viewer's eye.

Another way to look at this concept, in one example embodiment, is that the target version is selected to be a minimum of the decoding capability, display capability and viewing capability of a viewer (based at least on a distance of a viewer to the display 260).

As is clear from the above examples, the encoding attribute used for selecting the target version generally relates to a display property of video content. In other words, the encoding attribute excludes decoder-centric attributes, such as how motion compensation is implemented, and includes attributes that relate to display of the video content. In one particular example, the encoding attribute relates to a display capability of the display 260 used to display the video content to a viewer.

While the encoding attribute in some of the above examples is frame size in pixels including horizontal and vertical dimensions, other encoding attributes may be used, such as: pixels per frame; frame rate; scanning type; colour depth. The encoder profile and encoder profile level may also be used in as far as they relate to display properties of video content.

Also, it is clear from the above examples that the computer processor 220 is usefully configured to compute the target value based at least in part on a display capability of the display 260 at the video streaming client. More specifically, the computer processor 220 is configured to compute the target value based at least in part on the display resolution of the display 260 at the video streaming client.

While an example display resolution has been given for the display, in practice it is envisaged that the concept may be applied to a number of display resolutions such as: 320×240; 512×288; 640×480; 768×432; 960×540; 1024×576; 1280×720; 1920×1080; 2560×1440; 3840×2160; and 7680×4320 pixels.

As already described, the target version may be available in a plurality of bitrate versions, the computer processor 220 being configured to select to stream the target version at the highest available bitrate version which is supported by the data communication speed.

The video streaming server 20 is configured to store a plurality of versions, at least two versions being encoded to a different value of the encoding attribute. The computer processor 220 is configured to select one of the plurality of versions to stream. Additionally, or alternatively, the video streaming server 20 is configured to perform transcoding of the video content on-the-fly, and the computer processor 220 is configured to request an on-the-fly transcoded version encoded to the target value of the encoding attribute. The computer processor 220 is configured to request a particular on-the-fly transcoded version based at least in part on the data communication speed between the video streaming server 20 and the video client 200.

Figure 11:
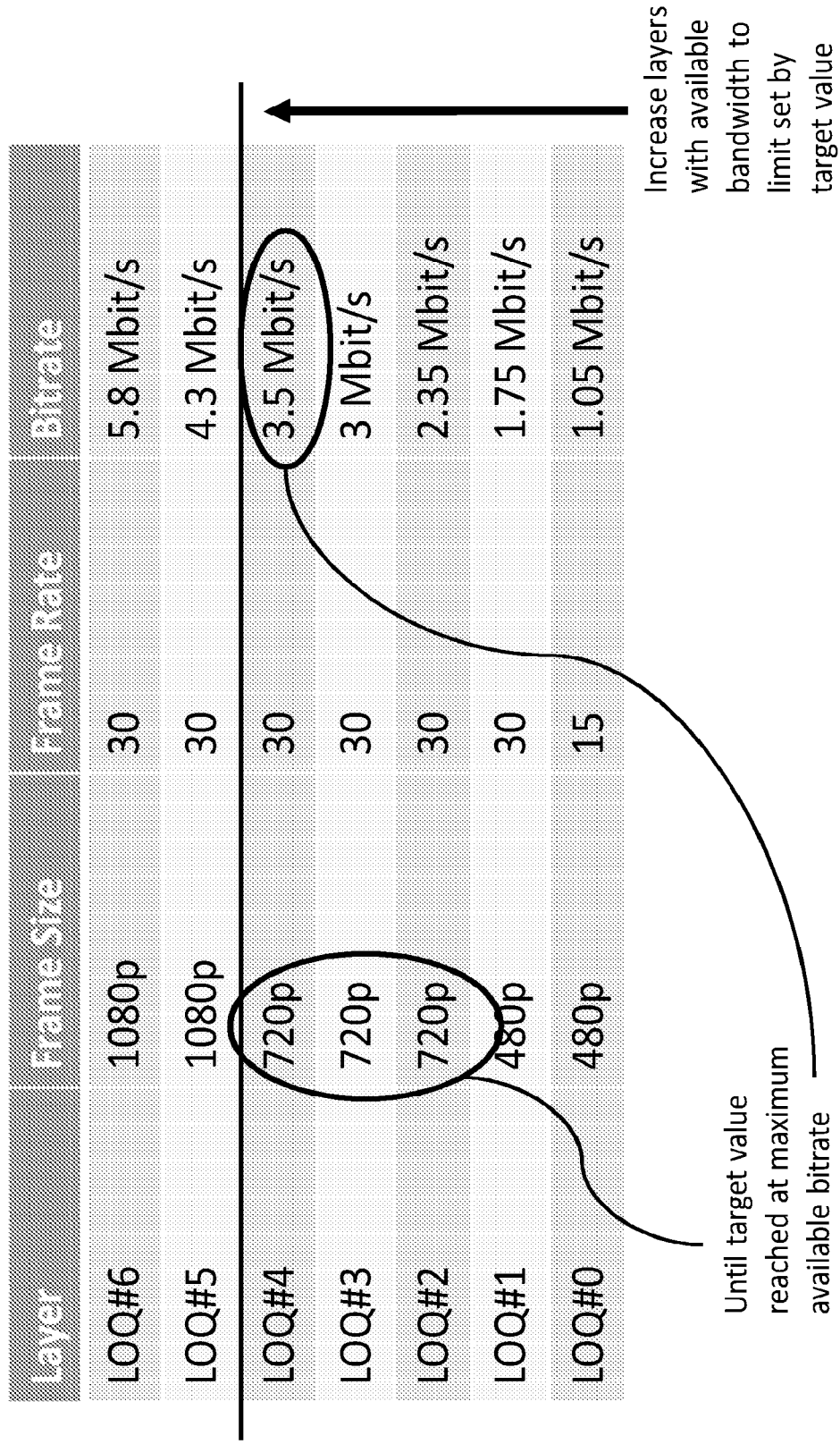
FIG. 11 is a table illustrating how the concept works with layered scalable bitstreams.

In the examples given, the computer processor is configured to stream the video content in multi-second or part-second segments of encoded video data. FIG. 11 is a table illustrating how the concept works with layered scalable bitstreams. For example, the video content is arranged in a plurality of hierarchical layers, LOQ#0, LOQ#1, LOQ#6 (although more or fewer layers may be used). Each layer corresponds to a differently encoded version of the video content, so that layer LOQ#0 corresponds to a base encoding of 480p frame size and scanning at 15 frames per second, encoded to 1.05 Mbit/s bitrate. Adding layer LOQ#1 to the bitstream allows the frame rate to increase from 15 frames per second to 30 frames per second, at an increased cost to bitrate, which has increased to 1.75 Mbit/s. FIG. 11 explains the increases in frame size and bitrate with each subsequent layer. When all layers are present in the bitstream, then the frame size is 1080p at 30 frames per second, with a bitrate of 5.8 Mbit/s.

Now, in the example given with reference to FIGS. 5 to 8, the encoding attribute, or parameter, is frame size and relates to a display property of the video content. The target value is computed to be '720p', from the display resolution of the display 260, even though decoder 240 can handle 1080p encoded data. The video streaming client on client device 200 is configured to select a version of the scalable bitstream which will deliver the video content encoded at the target value of the encoding attribute, and which has a cumulative bitrate which may be downloaded without playback interruption due to the available bandwidth between the video streaming server 20 and video client 200 being sufficient. If the bandwidth will support a cumulative scalable bitstream with a bitrate of 3.5 Mbit/s, then all layers up to LOQ#4 are selected for download, even if the bandwidth will support the downloading of layers LOQ#5 and LOQ#6.

In other words, the target version is encoded to comprise a base layer and an enhancement layer, wherein the base layer is decodable to present the video content at a base level of video reproduction quality, and the enhancement layer is decodable with the base layer to present the video content at an enhanced level of video reproduction quality which is higher than the base level of reproduction quality.

When the target value is a first value, the computer processor 220 is configured to select to stream a target version comprising the base layer only, and when the target value is a second higher value, the computer processor 220 is configured to select to stream a target version comprising the base layer and the enhancement layer.

Full discussions on how the base layers and enhancement layers are encoded are given in international patent applications published as WO 2013/171173, WO 2014/170819, U.S. Ser. Nos. 13/188,226 and 13/188,201 all of which are incorporated herein by reference.

In one implementation, the video content is delivered using a content delivery network. A content delivery network or content distribution network (CDN) is a globally distributed network of proxy servers deployed in multiple data centres. The goal of a CDN is to serve content to end-users with high availability and high performance. CDNs serve a large fraction of the Internet content today, including web objects (text, graphics and scripts), downloadable objects (media files, software, and documents), applications (e-commerce, portals), live streaming media, on-demand streaming media, and social networks. Content may served using both dedicated servers and other peer-user owned computers as applicable. It is anticipated that the video streaming server 20 is implemented within a CDN, and is in particular an edge server of a CDN, that is, a server having direct contact from the CDN to client devices 200.

Figure 12:
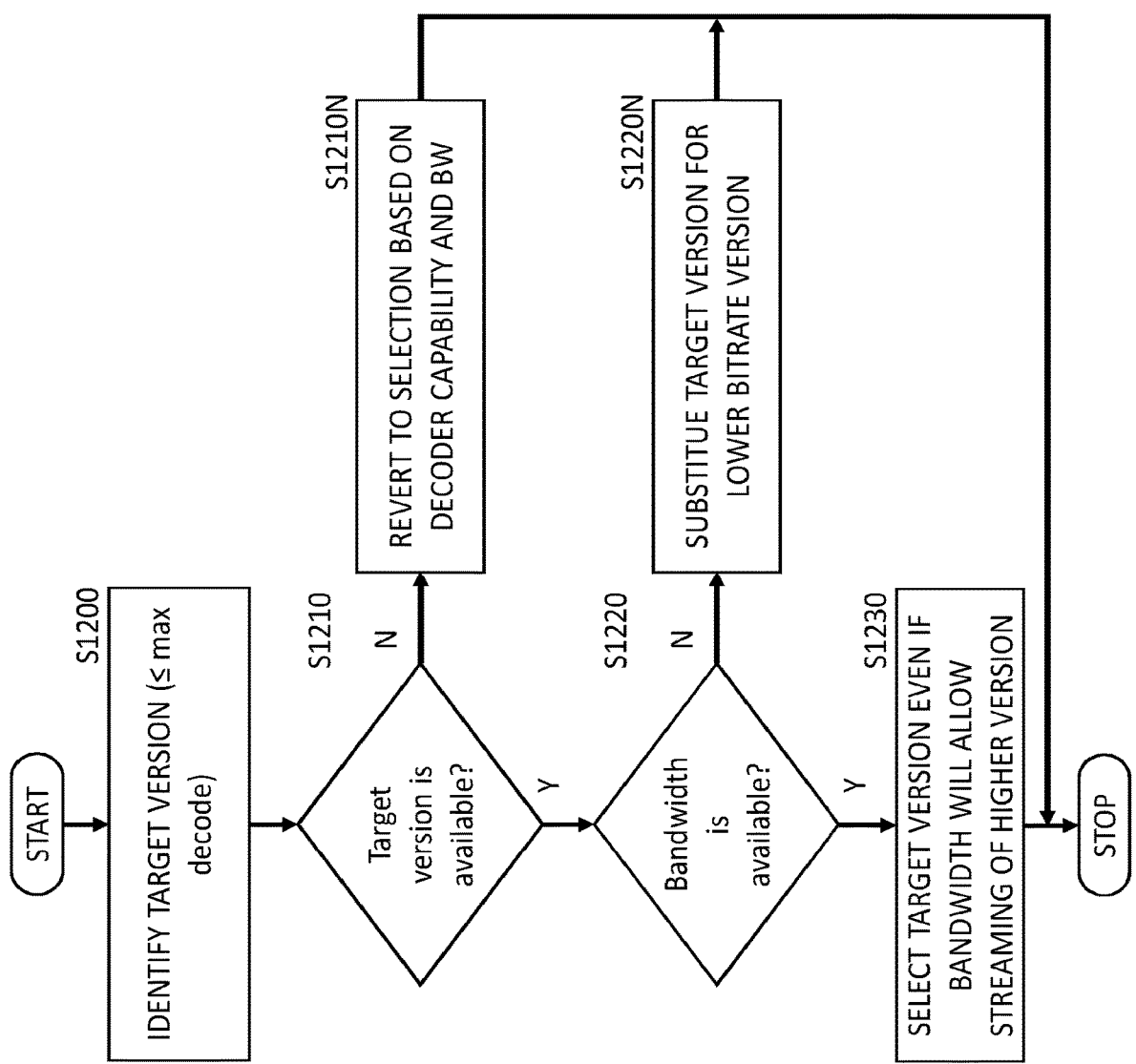
FIG. 12 is a flowchart outlining a method of selecting video content to stream across a network.

FIG. 12 is a flowchart outlining a method of selecting video content to stream across a network. The video content is available in a plurality of differently encoded versions.

The flowchart is described with reference to the steps shown on FIG. 12 in ascending number order as follows.

S1200: Identifying a target version of a desired video content for streaming from the video streaming server 20. Here, the target version is encoded to a target value of an encoding attribute, as discussed previously. The identification of the target version may be done by looking for a version of the desired video content on the video streaming server 20 that matches the target encoding attribute, or by estimating what the target version might be from look-up tables or equivalent or other estimation methods based on the encoding attribute.

S1210: A check is made as to whether the target version is available on the video streaming server 20. Normally, this check is made by a video streaming client on one of client devices 200.

S1210N: If the target version is not available, then the method reverts to selecting an encoded version based on a decoder capability of client device 200 and the available bandwidth.

S1220: If the target video version is available, a determination is made as to whether the data communication speed between the video streaming server and the client device 200 is sufficient to stream and display the target version of the desired video content at the video streaming client. Optionally, the determination requires that the desired video content can be streamed and displayed without playback interruption, as would be known to the person skilled in the art. Also, the data communication speed may be obtained before or after the check as to whether or not the target version is available. The bitrate of the target version may be known in advance, or an estimate made, so that the determination as to whether the data communication speed is sufficient can be made before it is known whether the target version is available.

S1220N: If the data communication speed, or bandwidth, is not available, the method chooses a lower bitrate version of the target version. In some cases, where the bandwidth is not available for any bitrate variant of the target version, the method may choose a next best version when compared to the target version, and where possible having the highest available bit rate supported by the available bandwidth. This version may correspond in some cases to a version which is encoded to a higher value of encoding attribute when compared to the target value (e.g. 1080p compared to a target value of 720p) but which, owing to other encoding constraints, has a lower bitrate.

S1230: If the bandwidth is available to stream the target version, then the target version is selected for streaming even though the data communication speed, or bandwidth, is sufficient to stream a version of the desired video content when encoded using a value of the encoding attribute which is higher than the target value. Again, optionally, the possible streaming of the version of the desired video content when encoded using a value of the encoding attribute which is higher than the target value is without playback interruption.

The target value is less than or equal to a maximum value of the encoding attribute which is decodeable by the video streaming client.

Of course, the skilled reader would see how the concept explains in relation to FIGS. 1 to 11 can be applied to add further features to the above-described method.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

The use of modular structure such as the one depicted in any of the Figures provides also an advantage from an implementation and integration point of view, enabling a simple integration into legacy systems as well as compatibility with legacy systems. By way of example, the adaptive bit rate coding method could be embodied as a plug-in (including libraries and/or source code) to an existing firmware and/or software which already embodies a legacy decoding system (for example one that is already installed in legacy decoders).

It is to be understood that any feature described in relation to any one embodiment may be used alone, or in combination with other features described, and may also be used in combination with at least one feature of any other of the embodiments, or any combination of any other of the embodiments. Furthermore, equivalents and modifications not described above may also be employed without departing from the scope of the invention, which is defined in the accompanying claims.

The invention claimed is:

1. A mobile computing device comprising:
   a computer processor;
   an integrated display;
   a communications port; and
   a decoder capable of decoding encoded video data received via the communications port, the decoder having a decoder capability, the decoder capability comprising at least one of maximum frame size, maximum color depth and maximum frame rate,
   wherein the computer processor is configured to:
   identify a target version of a desired video content for streaming from a video streaming server communicatively coupled to the communications port, the target version having been encoded to a desired target value of at least one encoding attribute, the at least one encoding attribute comprising at least one of a frame size, color depth and frame rate for display of the desired video content on the integrated display, and the desired target value being less than a maximum value of the encoding attribute which is decodable by the device;

request, from the video streaming server, to stream the target version of the desired video content even though a data communication speed from the video streaming server to the device via the communications port is sufficient to stream a version of the desired video content that is encoded at a higher value of the encoding attribute decodable and displayable by the device; and receive at the device the identified and requested target version of the desired video content.

2. The mobile computing device of claim 1, wherein the computer processor is configured to compute the target value based at least in part on a display resolution, the display resolution being less than a maximum resolution of the decoder.

3. The mobile computing device of claim 2, wherein the display resolution is one of the following: 320x 240; 512x 288; 640x 480; 768x 432; 960x 540; 1024x 576; 1280x 720; 1920x 1080; 2560x 1440; 3840x 2160; and 7680x 4320 pixels.

4. The mobile computing device of claim 1, further comprising:
 a sensor included in or next to the integrated display;
 wherein the computer processor is configured to obtain the at least one target value based at least in part on a viewing distance of a viewer to the integrated display measured using the sensor, wherein the computer processor is configured to decrease the target value if the viewer moves further than a second distance threshold from the integrated display.

5. The mobile computing device of claim 1, wherein the video streaming server performs transcoding of the video content on-the-fly, and the computer processor is configured to request an on-the-fly transcoded version encoded to the target value of the encoding attribute, wherein the video streaming client is configured to request a particular on-the-fly transcoded version based at least in part on the data communication speed.

6. The mobile computing device of claim 1, wherein the video streaming client is configured to stream the video content in multi-second or part-second segments of encoded video data.

7. The mobile computing device of claim 1, wherein the target version is encoded to comprise a base layer and an enhancement layer, wherein the base layer is decodable to present the video content at a base level of video reproduction quality, and the enhancement layer is decodable with the base layer to present the video content at an enhanced level of video reproduction quality which is higher than the base level of reproduction quality, wherein when the target value is a first value, the computer processor is configured to select to stream a target version comprising the base layer only, and when the target value is a second higher value, the computer processor is configured to select to stream a target version comprising the base layer and the enhancement layer.

8. A method of streaming video content to a mobile computing device across a network, the video content being available in a plurality of differently encoded versions, the method comprising:
 identifying, at a computer processor of the mobile computing device, a target version of a desired video content for streaming from a video streaming server, the target version having been encoded to a desired target value of at least one encoding attribute, the at least one encoding attribute comprising at least one of a frame size, color depth and frame rate for display of the desired video content on an integrated display of the mobile computing device, wherein the desired target value is less than a maximum value of the encoding attribute which is decodable by a decoder capability of the mobile computing device, the decoder capability comprising at least one of maximum frame size, maximum color depth and maximum frame rate;

when the target version is available at the video streaming server:
  requesting, by the computer processor of the mobile computing device, from the video streaming server to stream the target version of the desired video content even though a data communication speed from the video streaming server to the mobile computing device is sufficient to stream a version of the desired video content that is encoded at a higher value of the encoding attribute decodable and displayable by the mobile computing device;
  receiving, at the mobile computing device, the encoded target version of the desired video content;
  decoding, at a decoder of the mobile computing device, the encoded target version of the desired video content; and
  displaying, on the integrated display of the mobile computing device, the decoded target version of the desired video content.

9. The method of claim 8, wherein the target value is obtained based at least in part on a viewing distance of a viewer to the integrated display.

10. The method of claim 9, wherein the target value is increased if the viewer moves closer than a first distance threshold to the integrated display and wherein the target value is decreased if the viewer moves further than a second distance threshold from the integrated display.

11. The method of claim 10, wherein the mobile computing device comprises a sensor configured to measure the distance of the viewer to the display.

12. The method of claim 8, wherein the target version is available in a plurality of bitrate versions, and wherein requesting to stream the target version comprises requesting to stream the target version at the highest available bitrate version which is supported by the data communication speed.

13. The method of claim 8, wherein the video streaming server stores a plurality of versions, each version being encoded to a different value of the encoding attribute.

14. The method of claim 8, wherein the video streaming server performs transcoding of the video content into the target version on-the-fly in response to a request for the video encoded to the target value of the encoding attribute.

15. The method of claim 14, wherein the transcoding is based at least in part on the data communication speed.

16. The method of claim 8, wherein the video content is streamed in multi-second or part-second segments of encoded video data.

17. The method of claim 8, wherein the target version is encoded to comprise a base layer and an enhancement layer, wherein the base layer is decodable to present the video content at a base level of video reproduction quality, and the enhancement layer is decodable with the base layer to present the video content at an enhanced level of video reproduction quality which is higher than the base level of reproduction quality.

18. The method of claim 17, wherein when the target value is a first value, the target version comprises the base layer only, and when the target value is a second higher value, the target version comprises the base layer and the enhancement layer.

19. The method of claim 8, wherein if the target version is not available, determining that the data communication speed is sufficient to stream and display a decoder version of the desired video content, wherein the decoder version is encoded using at the decoder capability, and streaming the decoder version.

20. A computer program product comprising non-transitory computer readable media having computer executable instructions encoded thereon which, when executed, cause a computer processor of a mobile computing device to:
- identify, a target version of a desired video content for streaming from a video streaming server, the target version having been encoded to a desired target value of at least one encoding attribute, the at least one encoding attribute comprising at least one of a frame size, color depth and frame rate for display of the desired video content on an integrated display of the mobile computing device,
- wherein the desired target value is less than a maximum value of the encoding attribute which is decodable by a decoder capability of the mobile computing device, the decoder capability comprising at least one of maximum frame size, maximum color depth and maximum frame rate;
- when the target version is available at the video streaming server:
  - Request, by the mobile computing device, from the video streaming server to stream the target version of the desired video content even though a data communication speed from the video streaming server to the mobile computing device is sufficient to stream a version of the desired video content that is encoded at a higher value of the encoding attribute decodable and displayable by the mobile computing device;
  - receive, at the mobile computing device, the encoded target version of the desired video content;
  - decode, via a decoder of the mobile computing device, the encoded target version of the desired video content; and
  - display, on the integrated display of the mobile computing device, the decoded target version of the desired video content.

* * * * *